(12) United States Patent
Thompson et al.

(10) Patent No.: US 11,561,313 B2
(45) Date of Patent: Jan. 24, 2023

(54) CREATING SEISMIC DEPTH GRIDS USING HORIZONTAL WELLS

(71) Applicant: Saudi Arabian Oil Company, Dhahran (SA)

(72) Inventors: Troy W. Thompson, Dhahran (SA); Jay Vogt, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 593 days.

(21) Appl. No.: 16/503,134

(22) Filed: Jul. 3, 2019

(65) Prior Publication Data
US 2021/0003729 A1 Jan. 7, 2021

(51) Int. Cl.
*G01V 1/34* (2006.01)

(52) U.S. Cl.
CPC .......... *G01V 1/345* (2013.01); *G01V 2210/16* (2013.01)

(58) Field of Classification Search
CPC ..... G01V 1/345; G01V 2210/16; G01V 13/03
See application file for complete search history.

(56) References Cited

U.S. PATENT DOCUMENTS

| | | |
|---|---|---|
| 2007/0032955 A1 | 2/2007 | Williams |
| 2010/0195440 A1 | 8/2010 | Bjerkholt |
| 2014/0233352 A1 | 8/2014 | Kacewicz et al. |
| 2015/0134255 A1* | 5/2015 | Zhang .................. G01V 9/00 702/7 |

FOREIGN PATENT DOCUMENTS

| | | | |
|---|---|---|---|
| CN | 104216009 A | * | 12/2014 |
| CN | 104895554 | | 9/2015 |
| CN | 104895554 A | * | 9/2015 |
| CN | 106597533 A | * | 4/2017 |
| CN | 107479095 A | * | 12/2017 |
| CN | 107783187 | | 3/2018 |
| CN | 109164487 A | * | 1/2019 |

OTHER PUBLICATIONS

Thompson, "Designing and Validating 2D Reservoir Models," SPE-188066-MS, SPE Kingdom of Saudi Arabia Annual Technical Symposium and Exhibition held in Dammam, Saudi Arabia, pp. 24-27, Apr. 2017, 13 pages.
PCT International Search Report and Written Opinion in International Appln. No. PCT/US2020/040124, dated Sep. 24, 2020, 25 pages.

* cited by examiner

*Primary Examiner* — Tarun Sinha
*Assistant Examiner* — Yossef Korang-Beheshti
(74) *Attorney, Agent, or Firm* — Fish & Richardson P.C.

(57) ABSTRACT

Methods, systems, and computer-readable medium to perform operations including: clipping an average velocity grid of a seismic reference surface (SRSAV), in an oil and gas field, to remove average velocity data of a region containing high-angle, horizontal (HA/HZ) boreholes, wherein the seismic reference surface approximates a geological reference surface; based on (i) a depth grid of the geological reference surface (GRSD) generated using HA/HZ borehole data, and (ii) a time grid of the seismic reference surface (SRST), generating borehole average velocity grid (BAV) along the HA/HZ boreholes; gridding the BAV with the clipped SRSAV to generate a hybrid seismic borehole average velocity grid (HSBAV) of the oil and gas field; and based on the HSBAV and the SRST, generating a hybrid seismic geological depth grid (HSGD) of the oil and gas field.

20 Claims, 13 Drawing Sheets
(10 of 13 Drawing Sheet(s) Filed in Color)

450

CREATING SEISMIC DEPTH GRIDS USING HORIZONTAL WELLS

BACKGROUND

Traditionally, vertical well drilling has been used in oil and gas fields for hydrocarbon exploration and extraction. More recently, high-angle, horizontal (HA/HZ) well drilling is being used in oil and gas fields, particularly to optimize oil recovery from reservoir zones or shale reservoirs. However, many current geological modeling techniques only utilize data from vertical wells. Additionally, fields that have three-dimensional (3D) seismic survey coverage have struggled to honor HA/HZ well data.

SUMMARY

Aspects of the subject matter described in this specification may be embodied in methods that include the actions of: clipping an average velocity grid of a seismic reference surface (SRSAV), in an oil and gas field, to remove average velocity data of a region containing high-angle, horizontal (HA/HZ) boreholes, wherein the seismic reference surface approximates a geological reference surface; based on (i) a depth grid of the geological reference surface (GRSD) generated using HA/HZ borehole data, and (ii) a time grid of the seismic reference surface (SRST), generating borehole average velocity grid (BAV) along the HA/HZ boreholes; gridding the BAV with the clipped SRSAV to generate a hybrid seismic borehole average velocity grid (HSBAV) of the oil and gas field; and based on the HSBAV and the SRST, generating a hybrid seismic geological depth grid (HSGD) of the oil and gas field.

The previously-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium. These and other embodiments may each optionally include one or more of the following features.

In a first aspect, where the SRST is measured from a seismic reference datum (SRD).

In a second aspect, where based on (i) a depth grid of the geological reference surface (GRSD) generated using HA/HZ data, and (ii) a time grid of the seismic reference surface (SRST), generating borehole average velocity data (BAV) includes: subtracting a seismic reference datum from the GRSD to convert the GRSD from True Vertical Depth SubSea Suggest (TVDSS) to True Vertical Depth Seismic Reference Datum (TVDSRD).

In a third aspect, adding a seismic reference datum to the HSGD to convert the HSGD from True Vertical Depth Seismic Reference Datum (TVDSRD) to True Vertical Depth SubSea Suggest (TVDSS).

In a fourth aspect, where the SRSAV is generated by taking a ratio of a depth grid of the seismic reference surface (SRSD) to the SRST.

In a fifth aspect, where the GRSD is generated using two-dimensional (2D) conformal modelling.

In a sixth aspect, using the HSGD to grid a subsurface of the oil and gas field.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the following description. Other features and advantages of the disclosure will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
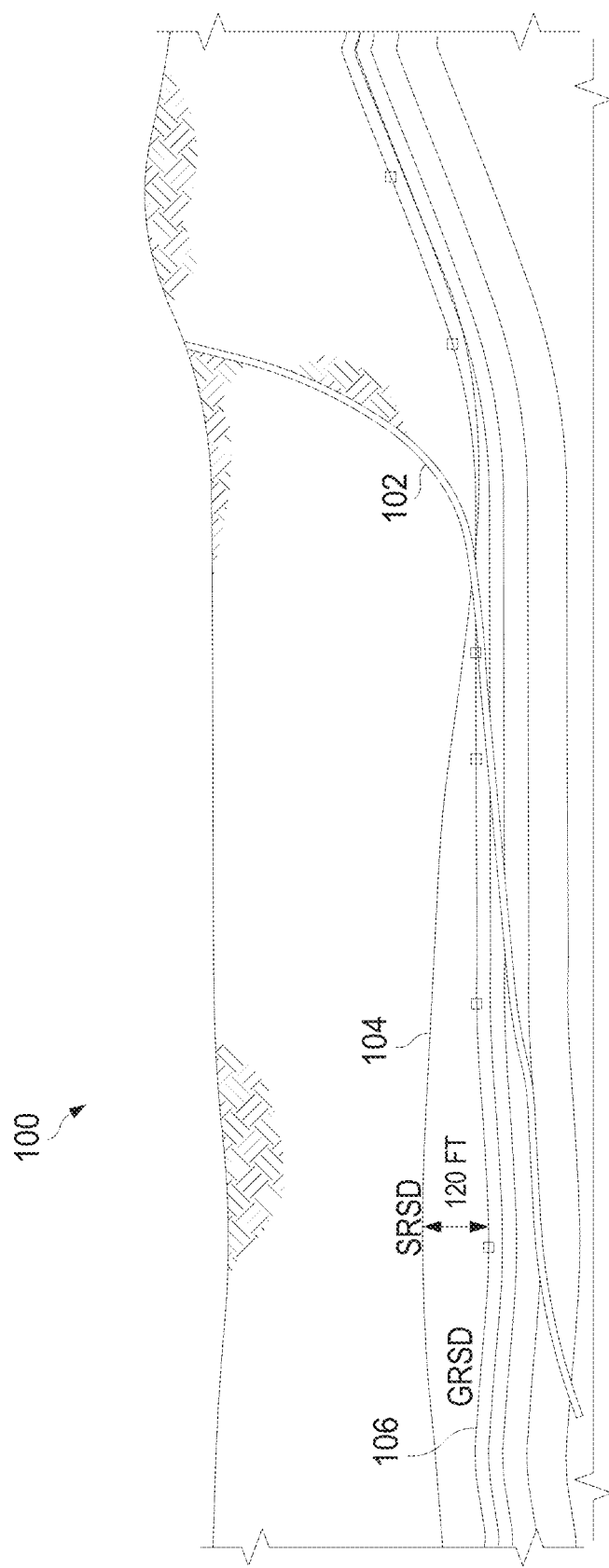
FIG. 1 illustrates a Seismic Reference Surface Depth (SRSD) grid and a Geological Reference Surface Depth (GRSD) grid in subsurface, according to some implementations.

The following detailed description describes systems and methods for generating depth grids in hydrocarbon oil and gas fields that include high-angle, horizontal (HA/HZ) wells, and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

For the purposes of this disclosure, "gridding" refers to a modeling technique that generates a mathematical representation of a three-dimensional (3D) surface on a two-dimensional (2D) plane. The generated representation is referred to as a 2D grid. A topographic map showing the shape of surface elevation is an example 2D grid. In general, all surfaces below the ground have some degree of curvature. One way to model these surfaces is by generating 2D grids of the surfaces. The 2D grids are defined by a projection/coordinate system, origin (X, Y location), value (Z), grid cell spacing, rotation, and extent. Generally, all 2D grids for a given oil and gas field reservoir share these same attributes with varying Z values, depending on the surface.

In one implementation of gridding, one surface serves as an initial surface grid from which all other surfaces in the subsurface are gridded. Typically, the initial surface, also referred to as a geological reference surface (GRS), is located at or near a primary reservoir target of an oil and gas field and often contains the most well penetrations in the field. The grids are combined into a reservoir model with each surface grid maintaining the correct shape relative to a GRS depth (GRSD) grid.

In practice, there are two methods for generating a GRSD grid: (i) gridding the GRSD grid using well data only (for example, GRS formation picks and Grid Control Points (GCP)), or (ii) gridding the GRSD grid using the shape of a Seismic Reference Surface Depth (SRSD) grid as a guide. GCP are a collection of points (for example, an X-Y-Z scatter set) along all boreholes. GCP behave similar to formation picks except that they do not belong to a particular borehole. The SRSD is a seismically derived depth grid that attempts to replicate the GRSD, and generally uses only vertical wells in the time-to-depth conversion process.

In theory, using the second method is advantageous so that the GRSD grid conforms from the SRSD grid because the areal extent of the SRSD grid is much greater than using well data alone. However, seismic depth grids generally have a high degree of uncertainty caused by various factors, such as seismic resolution limitations and imprecise velocity models. The uncertainty is pronounced when comparing the SRSD grid to geological picks along HA/HZ wells. As a result, oil and gas fields containing HA/HZ wells rarely have these highly deviated wells honored by the SRSD grid. Because the GRSD serves as the initial gridding surface, if the determined depth of this surface is inaccurate relative to the SRSD grid, then any resulting models are also inaccurate. Therefore, using a SRSD grid to determine the GRSD grid is not favorable, particularly in fields that include HA/HZ boreholes.

There exists a technique, referred to as 2D Conformal Modeling (2DCM), that combines both well data and a SRSD grid to generate the GRSD grid. This technique is disclosed in the paper "SPE-188066-MS Designing and Validating 2D Reservoir Models," which is incorporated herein by reference. When correctly applied, 2DCM generates a GRSD grid that honors GRS formation picks and GCP along all HA/HZ well paths while conforming to the SRSD grid. After applying 2DCM along all HA/HZ wells, the resulting GRSD grid is shaped correctly along these wells. Because the GRSD grid honors GCP along all HA/HZ well paths, the GRSD grid generated using 2DCM is more accurate than the SRSD grid. As a result, there is a significant error associated with the SRSD grid when comparing the SRSD grid to the GRSD grid.

Regardless of the technique that is used to construct the GRSD grid, this surface needs to accurately reflect the correct structure along all HA/HZ well paths.

FIG. 1 illustrates a SRSD grid 104 and a GRSD grid 106 in a subsurface 100, according to some implementations. In this example, the subsurface 100 is of an oil and gas field that includes HA/HZ boreholes, such as HA/HZ borehole 102. As shown in FIG. 1, there is a significant difference between the SRSD grid 104 and the GRSD grid 106. In this example, the difference between the two grids is more than 120 feet in some locations. Because a conformal gridding algorithm is being used to carry the shape of the SRSD grid to the GRSD grid, it can be concluded that if the SRSD grid is inaccurate along the HA/HZ well paths, then it is equally likely to be inaccurate between the wells. Due to the inaccuracy of the SRSD grid in regions that include HA/HZ wells, models that rely on the SRSD grid are also inaccurate in those regions.

Disclosed is a method and system for generating an accurate depth grid for an oil and gas field that includes HA/HZ well regions. The depth grid is a hybrid depth grid that includes average velocity data derived from SRSD and GRSD grids. In particular, the hybrid depth grid includes an SRSD grid in regions outside HA/HZ well regions and includes a GRSD grid inside HA/HZ well regions. In an implementation, the method of generating the hybrid depth grid involves calculating GRSD-derived borehole average velocity in the HA/HZ well region (or well control). The method also includes calculating SRSD-derived average velocity outside of the HA/HZ well region. The average velocity data is then gridded to generate an updated hybrid seismic borehole average velocity grid that is then used to generate the hybrid depth grid.

Figure 2:
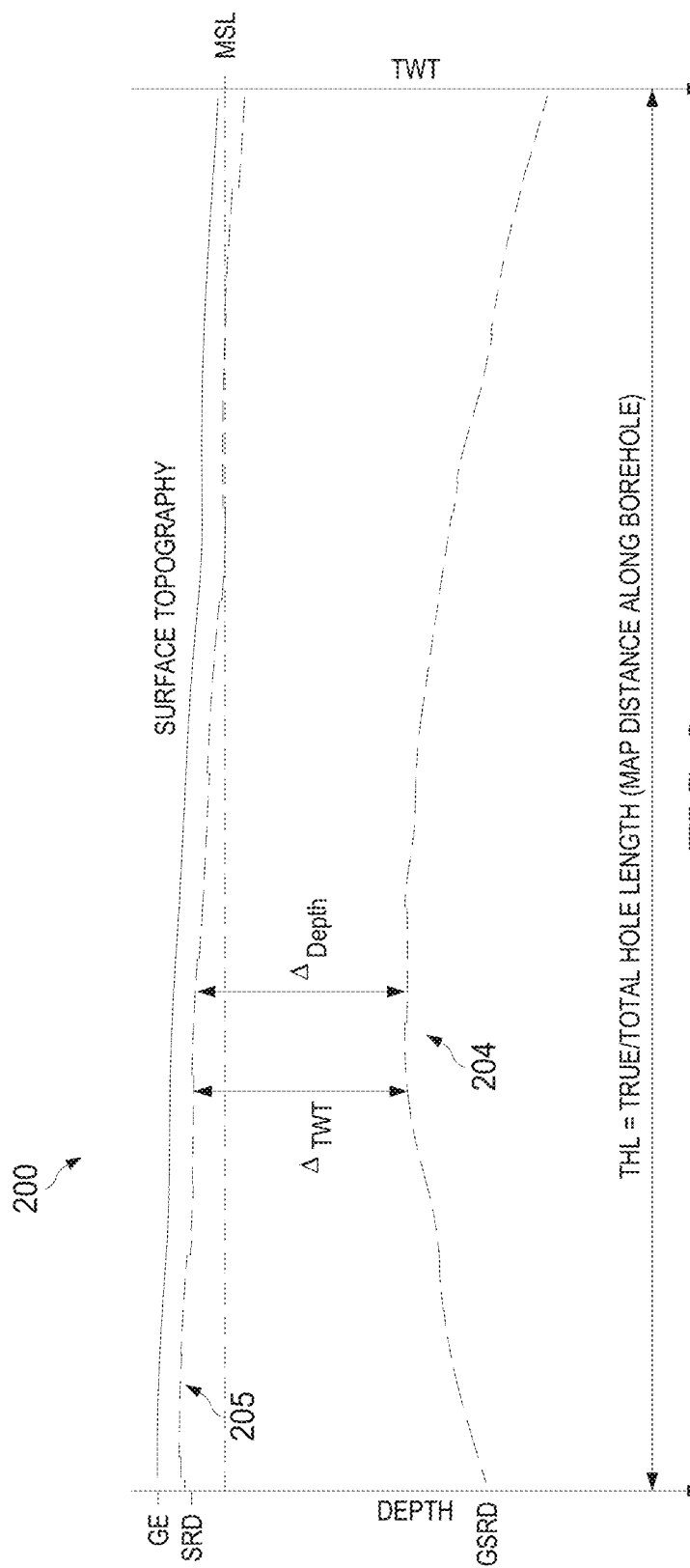
FIG. 2 illustrates a calculation of average seismic velocity in a subsurface, according to some implementations.

FIG. 2 illustrates a calculation of average velocity in a subsurface 200, according to some implementations. In particular, the average velocity of interest in the subsurface 200 is the average seismic velocity to a GRS. In general, the average velocity in a subsurface is calculated using equation (1):

$$\text{Average Velocity} = \frac{\Delta \text{Depth}}{\Delta TWT} \quad (1)$$

In equation (1), $\Delta$Depth is a change in depth from a reference surface to a surface of interest and $\Delta TWT$ is a change in two-way time from the reference surface to the surface of interest. In this example, the reference surface is a seismic reference datum (SRD) 205. At SRD 205, the time and depth are both equal to zero. Accordingly, the change is depth is calculated from a seismic reference datum (SRD) 205 to the GRS. Because the depth of the GRS is estimated using GRSD, the change in depth is calculated from the SRD 205 to GRSD 204. The change in two-way time from the SRD 205 to the GRS is calculated using a seismic reference surface time (SRST) grid. As described below, the SRST grid is indicative of traveltime of a seismic wave to the SRSD (not illustrated in FIG. 2).

In an implementation, the average velocity is calculated at a sampling length (N) along a borehole true/total hole length (THL). The sampling length may have the same spacing but not the exact location as each seismic trace in the subsurface 200. More specifically, to calculate the average velocity at the sample length (N), the time and depth grid are interpolated at each sampling length. Thus, borehole average velocity along THL ($BAV_{THL}$)=$GRSD_{THL}$/$SRST_{THL}$.

Figure 3A:
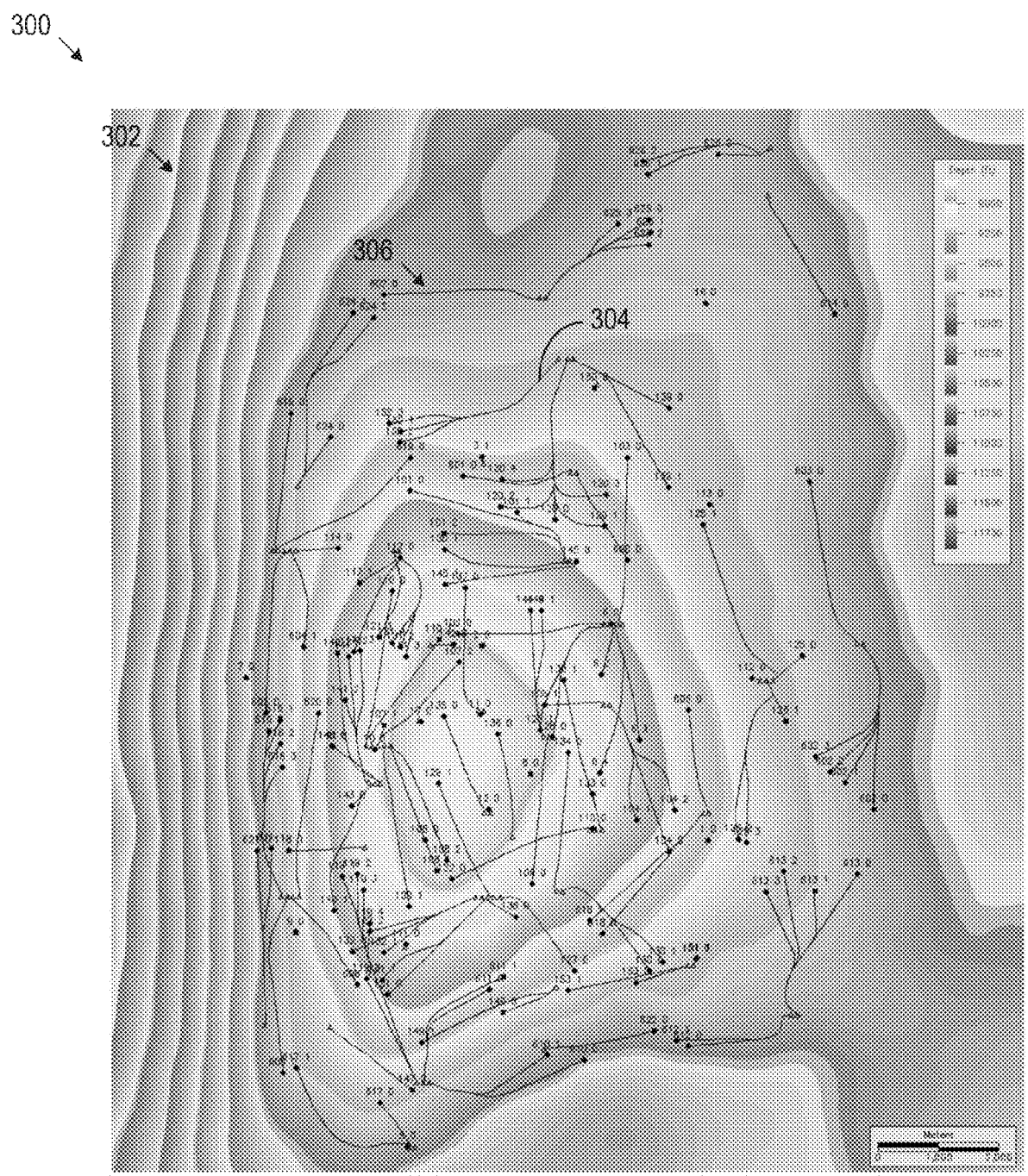
FIG. 3A illustrates a map of an oil and gas field that includes a HA/HZ borehole region, according to some implementations.

FIG. 3A illustrates a map 300 of an oil and gas field 302 that includes HA/HZ boreholes, according to some implementations. The HA/HZ boreholes are represented in FIG. 3A by segments, such as segment 304, that are imposed on the map 300. As shown by the map 300, the HA/HZ boreholes are clustered in a region referred to as a HA/HZ borehole region 306. In practice, SRSD grids are used for gridding the subsurface of the oil and gas field 302. However, as previously explained, SRSD grids are inaccurate in HA/HZ borehole regions, such as the HA/HZ borehole region 306.

Figure 3B:
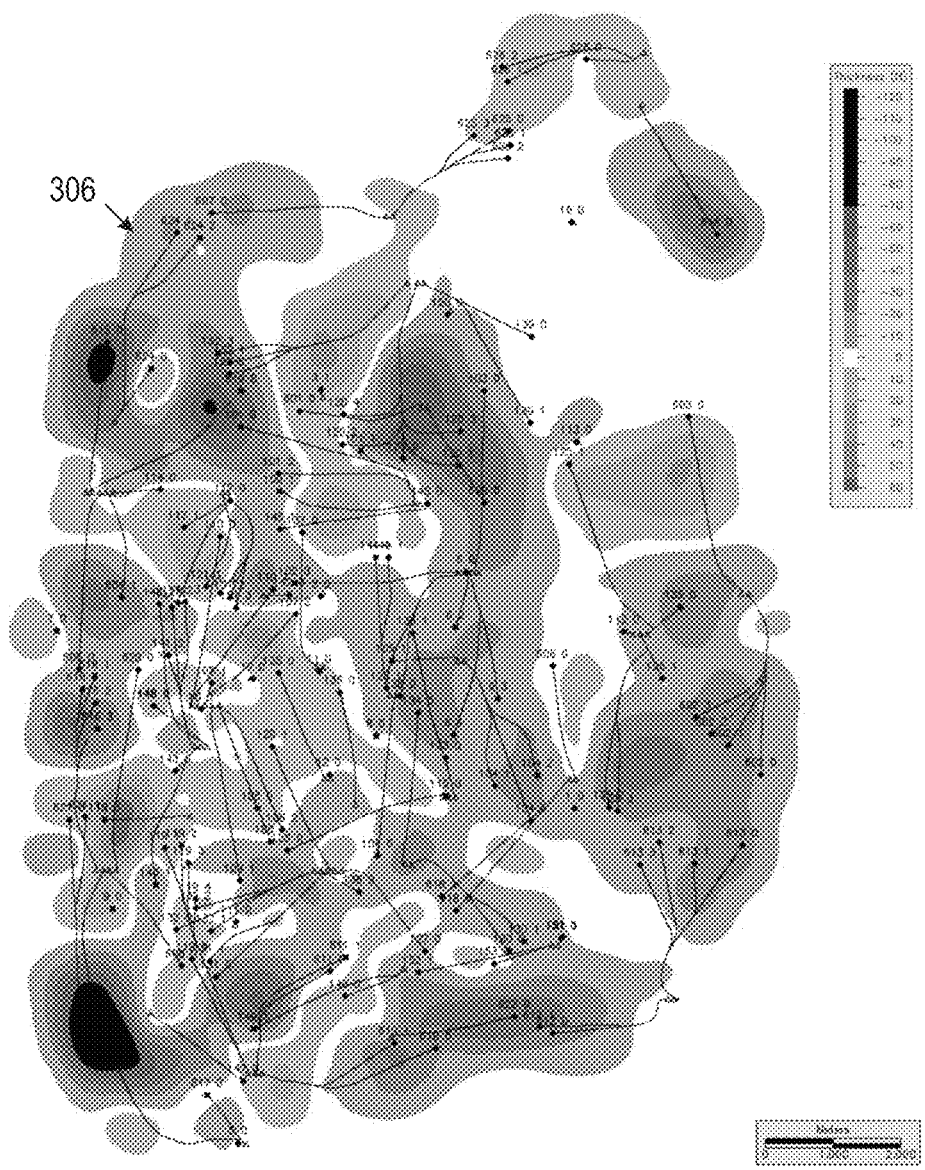
FIG. 3B illustrates a comparison of a SRSD grid and a GRSD grid for the HA/HZ borehole region, according to some implementations.

FIG. 3B illustrates a comparison of a SRSD grid and a GRSD grid for the HA/HZ borehole region 306, according to some implementations. In FIG. 3B, the shading in different regions illustrates the difference in feet (ft) between the two grids. As shown in FIG. 3B, there are significant differences between the two grids in many areas of the HA/HZ borehole region 306. Given that the GRSD grid more accurately approximates the surfaces in the HA/HZ borehole region 306, the GRSD grid can replace the traditional SRSD grid in that region.

In an implementation, to generate an accurate depth grid, referred to as a hybrid depth grid, for the oil and gas field 302, a seismic reference surface average velocity (SRSAV) grid of the field is generated. The SRSAV is clipped to remove the average seismic velocity data in the HA/HZ borehole region 306. Then, borehole average velocities (BAV) are computed along the HA/HZ borehole region 306 based on the GRSD and SRST grids of the region. The clipped section of the SRSAV is replaced by the BAV and both velocity sets are gridded to form a hybrid HSBAV grid. The hybrid HSBAV grid is then used to generate the hybrid depth grid. These steps are illustrated in FIGS. 4A-4G.

Figure 4A:
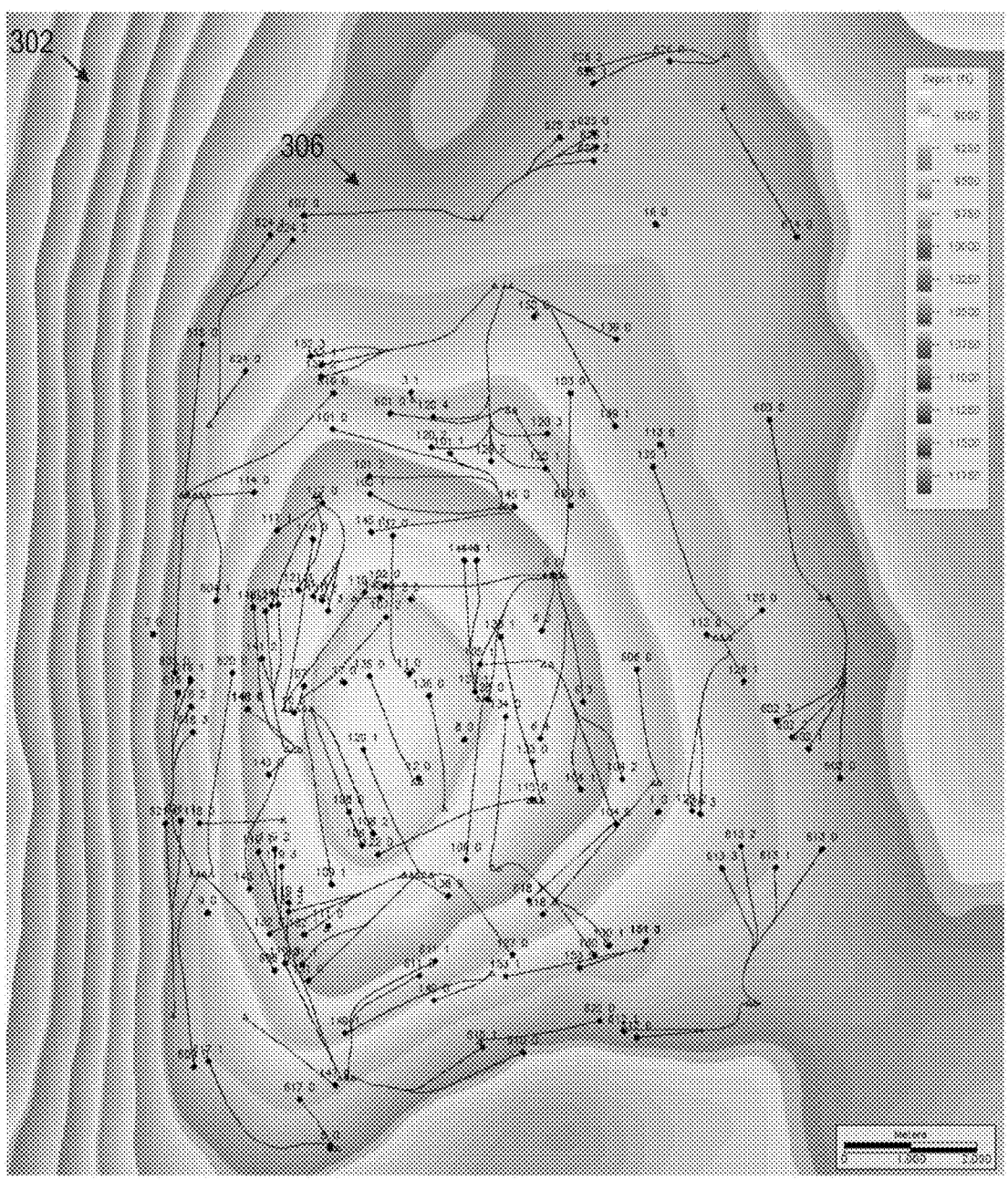
FIG. 4A illustrates a SRSD grid for the oil and gas field, according to some implementations.
Figure 4B:
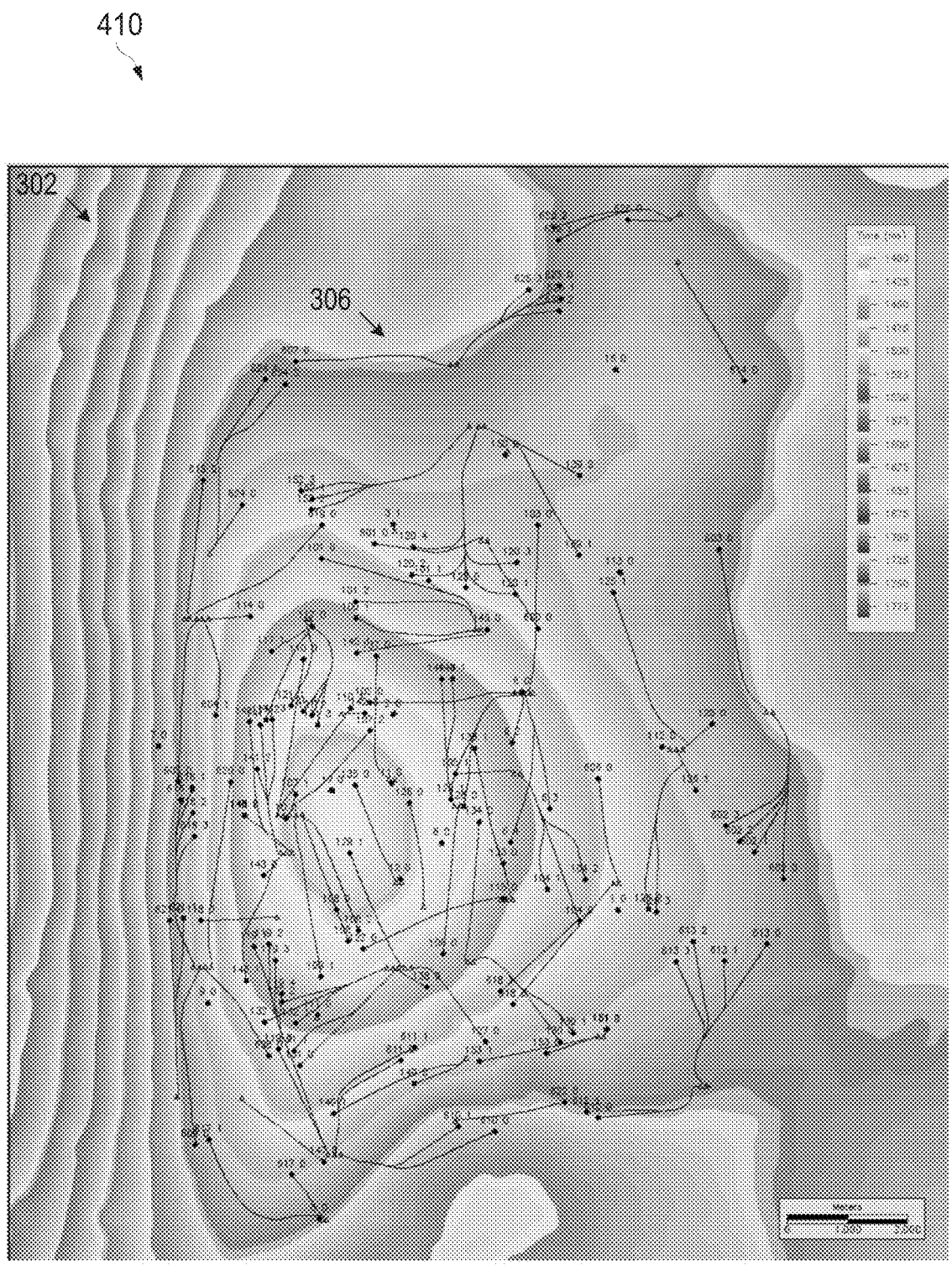
FIG. 4B illustrates a Seismic Reference Surface Time (SRST) grid for the oil and gas field, according to some implementations.

FIGS. 4A and 4B illustrate a seismic reference surface depth (SRSD) grid 400 and a seismic reference surface time (SRST) grid 410 of the oil and gas field 302, according to some implementations. The SRSD grid 400 is indicative of the ΔDepth from a seismic reference datum to a seismic reference surface and the SRST grid 410 is indicative of the ΔTWT from the seismic reference datum to the seismic reference surface. The SRSD grid 400 and the SRST grid 410 are used to generate a SRSAV grid. In particular, the SRSAV grid is generated by sampling the SRSD and SRST grids at discretized points. In some examples, the discretized points are not at the same location as the seismic traces but may have the same spacing in order to avoid biasing the data for gridding.

Figure 4C:
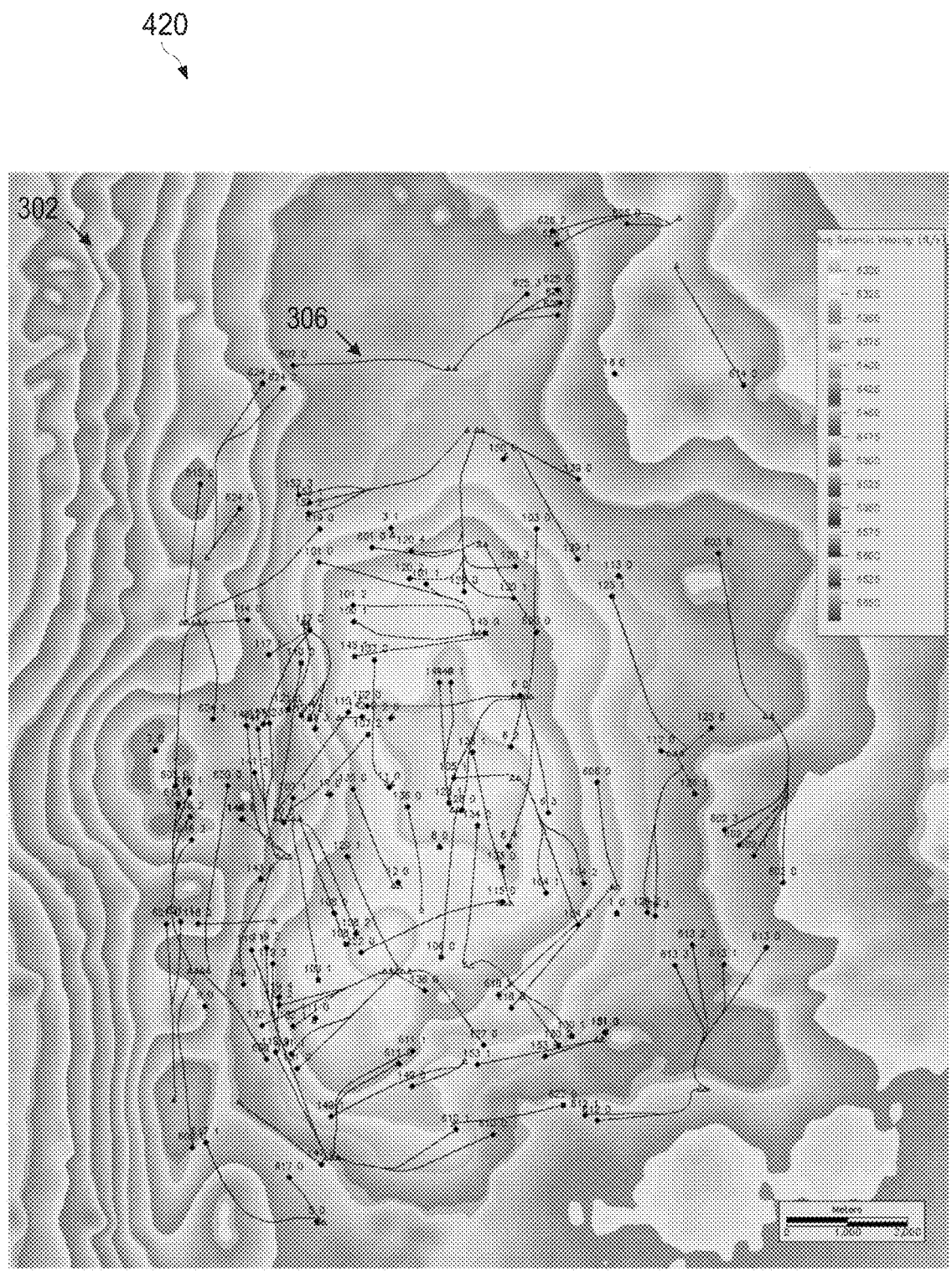
FIG. 4C illustrates a Seismic Reference Surface Average Velocity (SRSAV) grid for the oil and gas field, according to some implementations.

FIG. 4C illustrates a SRSAV grid 420 of the oil and gas field 302, according to some implementations. In particular, the SRSAV grid 420 is indicative of the average velocity between the seismic reference datum and the seismic reference surface. Once the SRSAV grid 420 is generated, the SRSAV 420 is clipped to remove the seismic average velocity data in the HA/HZ borehole region 306.

Figure 4D:
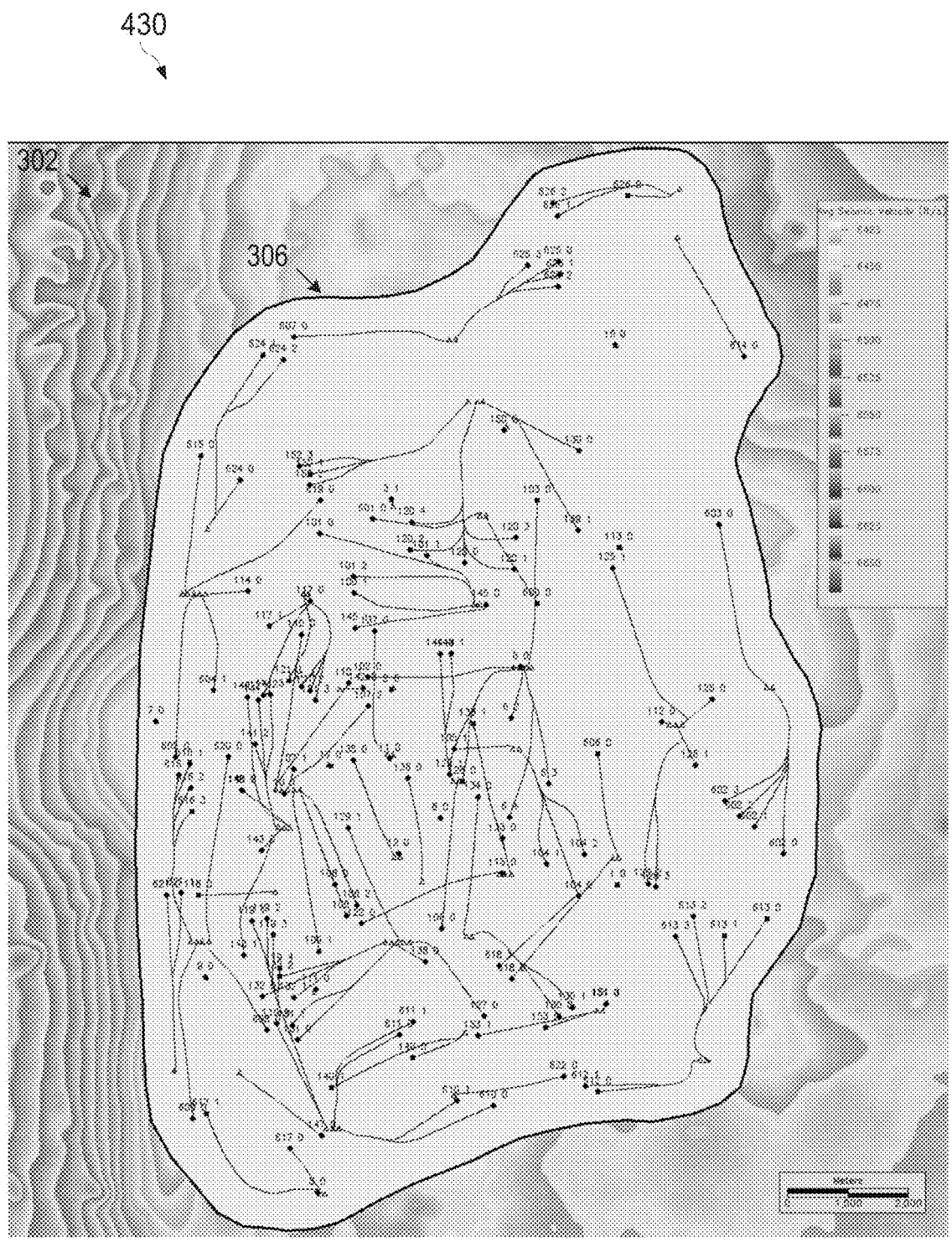
FIG. 4D illustrates a clipped SRSAV grid for the oil and gas field, according to some implementations.

FIG. 4D illustrates a clipped SRSAV grid 430 of the oil and gas field 302, according to some implementations. As shown in FIG. 4D, the seismic average velocity data is removed from the SRSAV grid in the HA/HZ borehole region. Once the SRSAV grid 430 is clipped, borehole average velocity data is calculated for the HA/HZ borehole region 306 using the GRSD grid for the region. In an example, the borehole average velocity is calculated by first converting the GRSD grid from True Vertical Depth SubSea (TVDSS) to True Vertical Depth Seismic Reference Datum (TVDSRD). Doing so shifts the depth zero reference for the GRSD grid from sea level to the seismic reference datum. The conversion from TVDSS to TVDSRD is achieved by subtracting the seismic reference datum from the GRSD, as shown in equation (2):

$$GRSD_{TVDSRD} = GRSD_{TVDSS} - SRD \quad (2)$$

Note that the GRSD is converted to TVDSRD only if the seismic data uses a floating datum as the time zero reference. However, if the seismic data uses sea level for the time zero reference, then the conversion is not performed.

Once the GRSD grid is converted to TVDSRD, the $GRSD_{TVDSRD}$ grid and the SRST 420 grid are used to calculate the borehole average velocity along the HA/HZ borehole paths in the HA/HZ borehole region 306. The resulting borehole average velocity (BAV) represents the average velocity for every N meters along the HA/HZ borehole paths. The BAV calculation is represented in equation (3):

$$BAV = \frac{GRSD}{SRST} \quad (3)$$

Figure 4E:
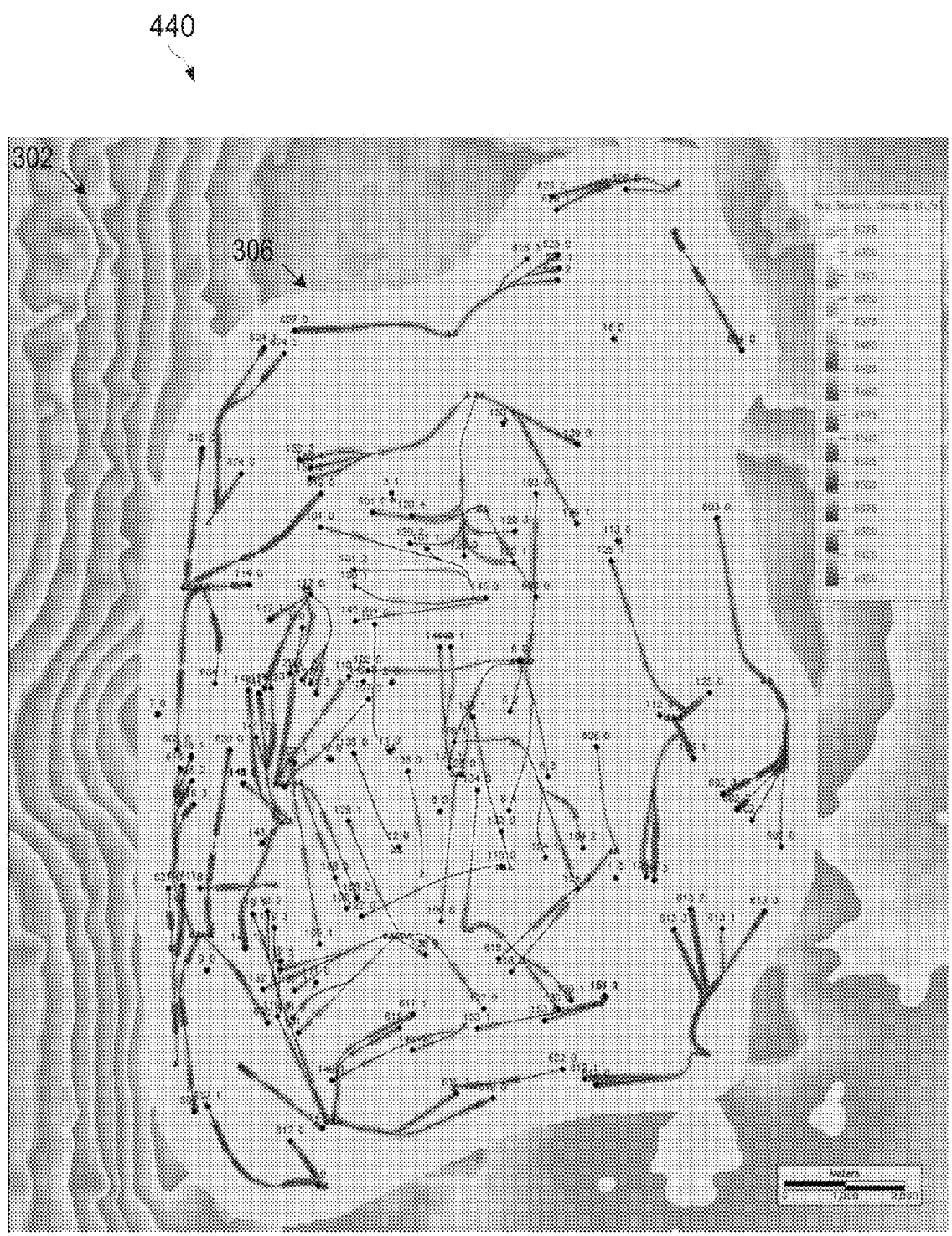
FIG. 4E illustrates Borehole Average Velocities (BAV) for the HA/HZ borehole region and clipped SRSAV, according to some implementations.

FIG. 4E illustrates borehole average velocities (BAV) 440 for the HA/HZ borehole region 306, according to some implementations. The BAV 440 represents the average velocity that is calculated using GRSD grid and SRST grid in the HA/HZ borehole region 306.

Once the BAV data 440 is generated, it is gridded along with the seismic average velocity data outside the HA/HZ borehole region 306 in order to generate a hybrid seismic borehole average velocity (HSBAV) grid that is indicative of the average velocity in the oil and gas field 302.

Figure 4F:
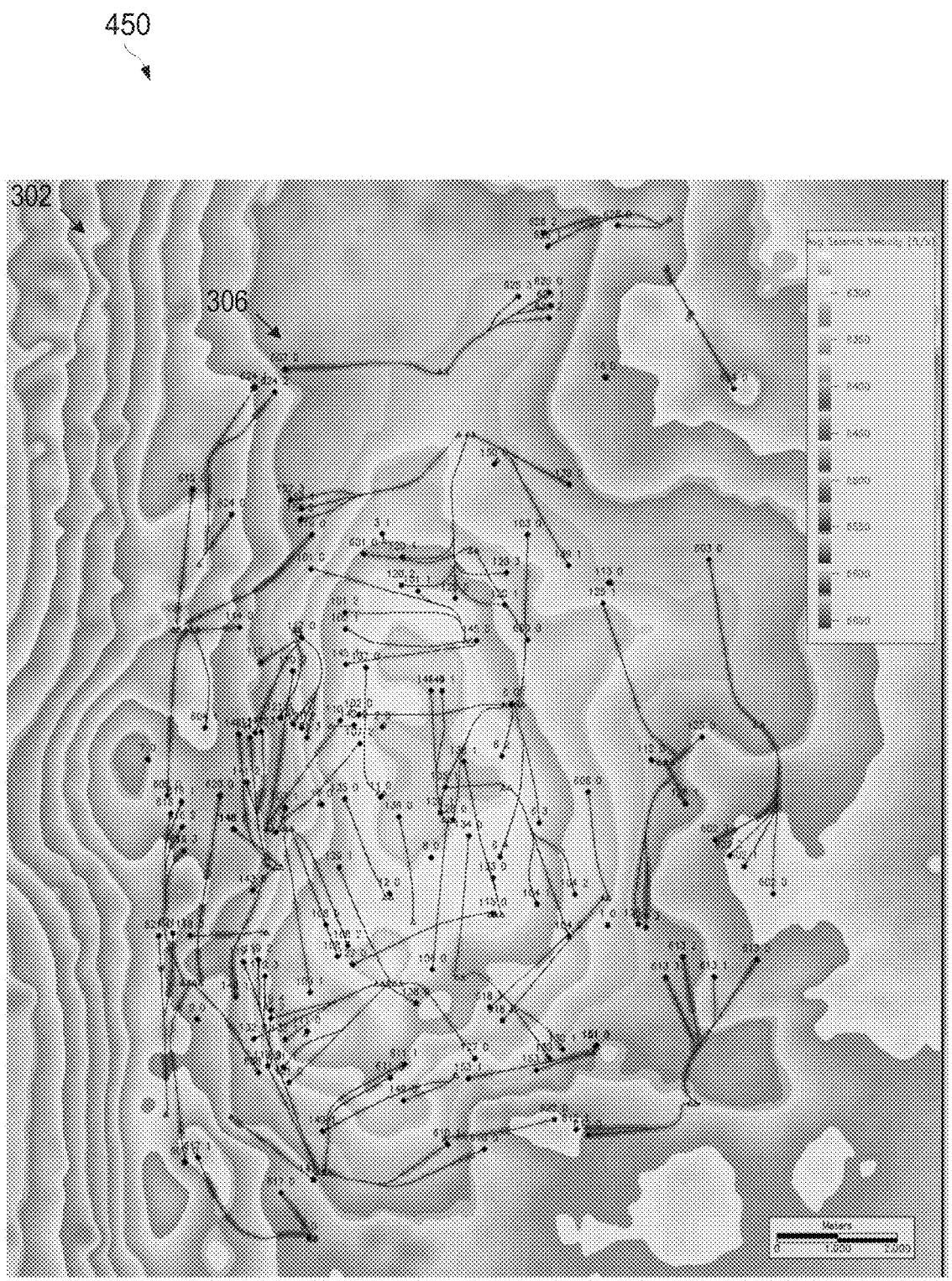
FIG. 4F illustrates a Hybrid Seismic Borehole Average Velocity (HSBAV) grid, according to some implementations.

FIG. 4F illustrates a hybrid seismic borehole average velocity (HSBAV) grid 450, according to some implementations. As shown by FIG. 4F, the HSBAV 450 is indicative of the average velocity throughout the oil and gas field 302.

Once the HSBAV grid 450 is generated, a hybrid depth grid (HSGD) of the oil and gas field is generated. In an implementation, the HSGD is generated by multiplying the HSBAV grid 450 by the SRST grid, as shown by equation (4):

$$HGSD = HSBAV * SRST \quad (4)$$

Figure 4G:
FIG. 4G illustrates a Hybrid Seismic Geological Depth (HSGD) grid for the oil and gas field, according to some implementations.

FIG. 4G illustrates a hybrid seismic and geological depth (HSGD) grid 460 of the oil and gas field 302 according to some implementations. As shown by FIG. 4G, the HSGD grid 460 is indicative of the depth of a geological reference surface in the oil and gas field 302. Once the HSGD grid 460 is generated, if the HSGD grid 460 is in TVDSRD, then the HSGD grid 460 is converted back to TVDSS. In an implementation, the $HSGD_{TVDSRD}$ is converted to TVDSS by adding SRD to the $HSGD_{TVDSRD}$, as shown by equation (5):

$$HGSD_{TVDSS} = HGSD_{TVDSRD} + SRD \quad (5)$$

Figures 5A, 5B, 5C:
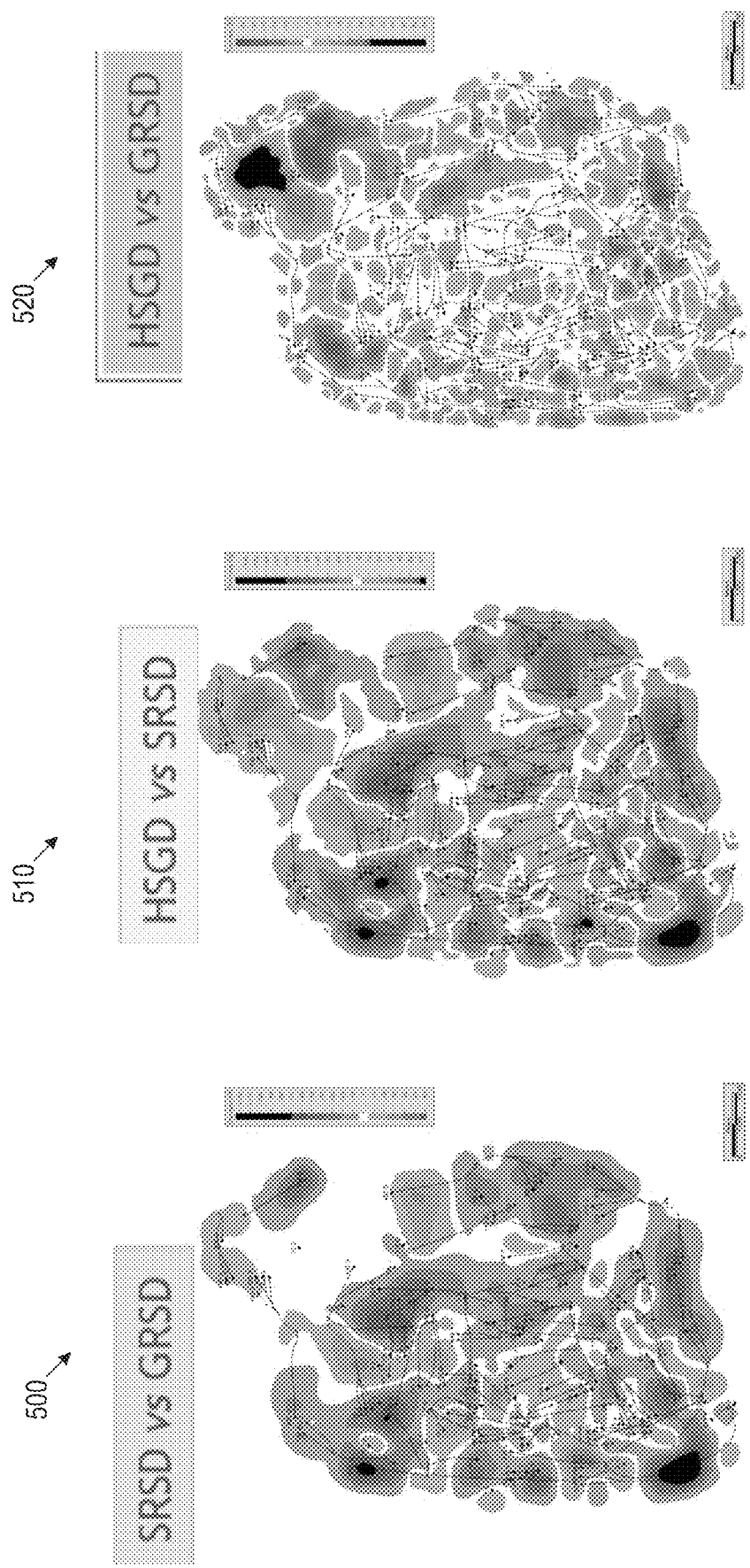
FIGS. 5A, 5B, and 5C illustrate a comparison of the SRSD grid, the GRSD grid, and the HSGD for the oil and gas field, according to some implementations.

FIGS. 5A, 5B, and 5C illustrate comparisons between a SRSD grid, a GRSD grid, and an HSGD grid for the oil and gas field 302, according to some implementations. As shown by map 500, the difference between the SRSD grid and GRSD grid is significant in most areas of the oil and gas field 302. Similarly, as shown by map 510, the difference between HSGD grid and SRSD grid is significant in most areas of the oil and gas field 302. However, as shown by map 520, the difference between and HSGD and GRSD is not significant in the HA/HZ borehole region 306.

Figure 6:
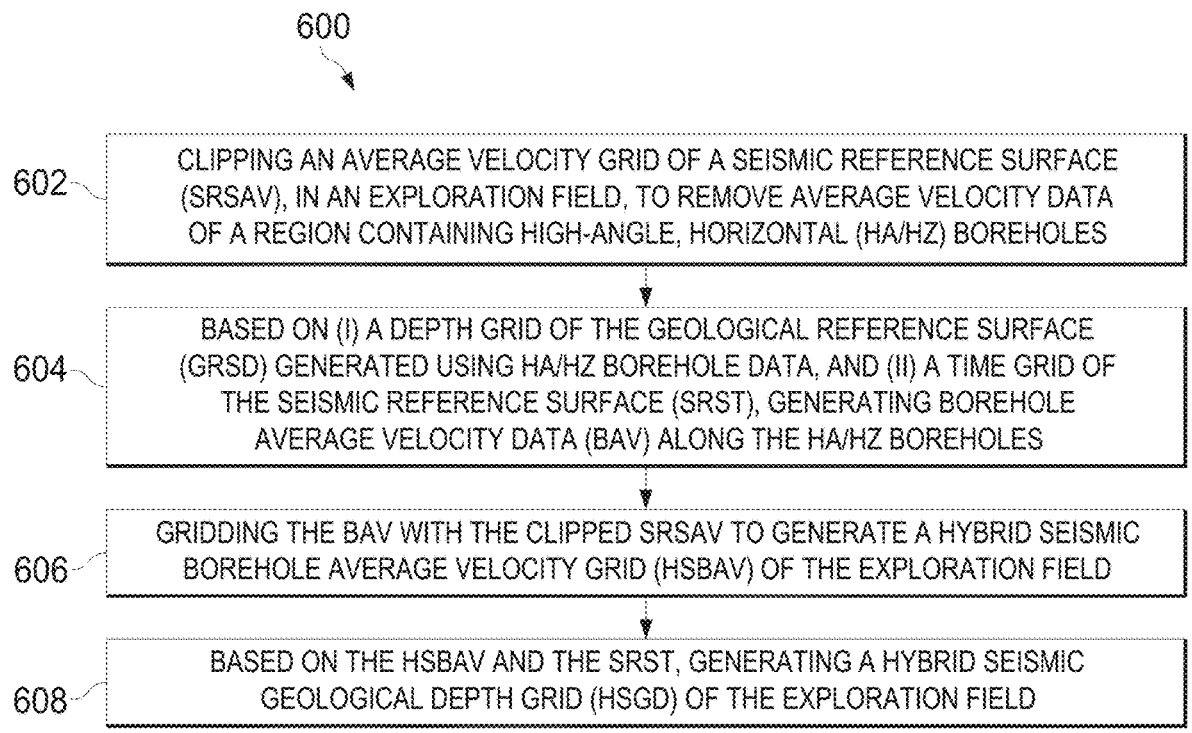
FIG. 6 illustrates a flowchart of an example method for generating a HSGD grid, according to some implementations.

FIG. 6 is a flow chart illustrating a method 600 for generating a hybrid seismic geological depth grid (HSGD), according to some implementations. For clarity of presentation, the description that follows generally describes method 600 in the context of the other figures in this description. For example, method 600 can be performed by a computer system described in FIG. 7. However, it will be understood that method 600 may be performed, for example, by any suitable system, environment, software, and hardware, or a combination of systems, environments, software, and hardware, as appropriate. In some implementations, various steps of method 600 can be run in parallel, in combination, in loops, or in any order.

At step 602, method 600 involves clipping an average velocity grid of a seismic reference surface (SRSAV), in an exploration field, to remove average velocity data of a region containing high-angle, horizontal (HA/HZ) boreholes. The SRSAV is generated using a time grid of a seismic reference surface (SRST) and a depth grid of the seismic reference surface (SRSD) and is indicative of the average seismic velocity in the oil and gas field. The SRST and the SRSD are generated using vertical well or borehole data. The SRSAV is clipped in order to remove the average velocity data of a region within the oil and gas field that contains HA/HZ boreholes (that is, a HA/HZ borehole region).

At step 604, method 600 involves, based on (i) a depth grid of the geological reference surface (GRSD) generated using HA/HZ borehole data, and (ii) a time grid of the seismic reference surface (SRST), generating borehole average velocity data (BAV) along the HA/HZ boreholes. The GRSD is generated using 2D Conformal Modeling (2DCM) that uses HA/HZ borehole data to generate the GRSD, and is indicative of the depth grid of the geological reference surface in the HA/HZ borehole region. The BAV is generated by taking a ratio of the GRSD to the portion of the SRST that corresponds to the HA/HZ borehole region.

At step 606, method 600 involves gridding the BAV with the clipped SRSAV to generate a hybrid seismic borehole average velocity grid (HSBAV) of the exploration field. The HSBAV uses both seismic average velocity and the average velocity along the HA/HZ boreholes to represent the average velocity in the oil and gas field. In particular, the average velocity in the HA/HZ borehole region is represented by the BAV and the average velocity outside the HA/HZ borehole region is represented by seismic average velocity.

At step 608, method 600 involves, based on the HSBAV and the SRST, generating a hybrid seismic geological depth grid (HSGD) of the exploration field. In particular, the HSBAV is multiplied by the SRST in order to generate the HSGD. The HSGD is indicative of the depth grid of the geological reference surface (GRS) in the oil and gas field. In the HA/HZ borehole region, the HSGD is based on the HA/HZ borehole data, and outside the HA/HZ borehole region, the HSGD is based on seismic depth data.

Figure 7:
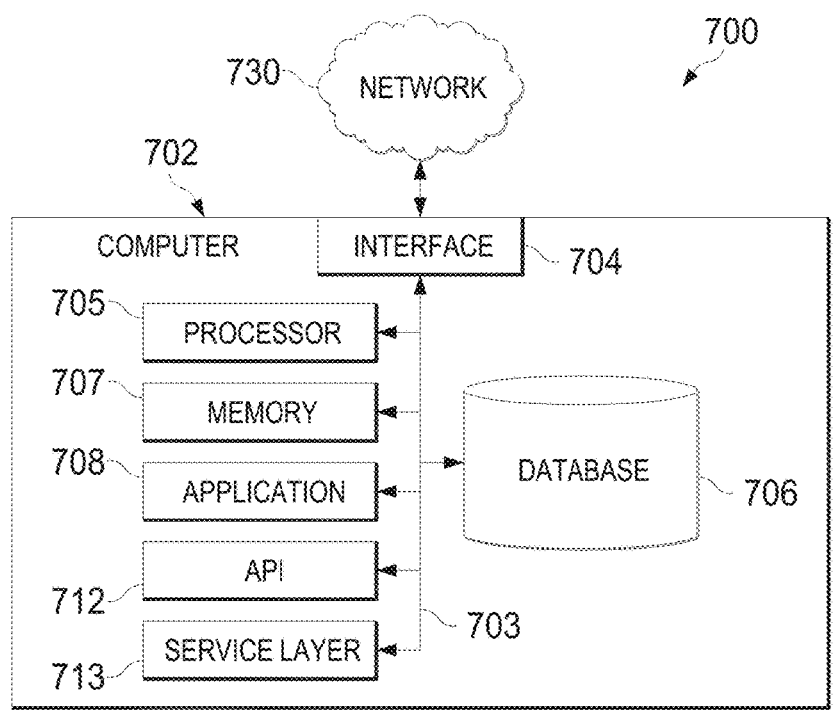
FIG. 7 illustrates a block diagram illustrating an example computer system used to provide computational functionalities associated with algorithms, methods, functions, processes, flows, and procedures as described in the instant disclosure, according to some implementations Like reference numbers and designations in the various drawings indicate like elements.

FIG. 7 is a block diagram of an example computer system 700 used to provide computational functionalities associated with described algorithms, methods, functions, processes, flows, and procedures as described in the instant disclosure, according to an implementation. The illustrated computer 702 is intended to encompass any computing device such as a server, desktop computer, laptop/notebook computer, wireless data port, smart phone, personal data assistant (PDA), tablet computing device, or one or more processors within these devices, or any other suitable processing device, including physical or virtual instances (or both) of the computing device. Additionally, the computer 702 may comprise a computer that includes an input device, such as a keypad, keyboard, or touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, or global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, or streaming data server, or other server (or a combination of servers).

The computer 702 can receive requests over network 730 from a client application (for example, executing on another computer) and respond to the received requests by processing the received requests using the appropriate software application(s). In addition, requests may also be sent to the computer 702 from internal users (for example, from a command console or by other appropriate access methods), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and may refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, or C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module, without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 comprises logic encoded in software or hardware (or a combination of software and hardware) and is operable to communicate with the network 730. More specifically, the interface 704 may comprise of software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, or conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). For example, memory 707 can be random access memory (RAM), read-only memory (ROM), optical, magnetic, and the like, storing data consistent with this disclosure. In some implementations, memory 707 can be a combination of two or more different types of memory (for example, a combination of RAM and magnetic storage) according to particular needs, desires, or particular implementations of the computer 702 and the described functionality. Although illustrated as a single memory 707 in FIG. 7, two or more memories 707 (of the same or a combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

There may be any number of computers 702 associated with, or external to, a computer system containing computer 702, each computer 702 communicating over network 730. Further, the term "client," "user," and other appropriate terminology may be used interchangeably, as appropriate, without departing from the scope of this disclosure. Moreover, this disclosure contemplates that many users may use one computer 702, or that one user may use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, or subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, or methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

We claim:
1. A method comprising:
   clipping an average velocity grid of a seismic reference surface (SRSAV), in an oil and gas field, to remove average velocity data of a region containing high-angle, horizontal (HA/HZ) boreholes, wherein the seismic reference surface approximates a geological reference surface;
   based on (i) a depth grid of the geological reference surface (GRSD) generated using HA/HZ borehole data, and (ii) a time grid of the seismic reference surface (SRST), generating borehole average velocity grid (BAV) along the HA/HZ boreholes;
   gridding the BAV with the clipped SRSAV to generate a hybrid seismic borehole average velocity grid (HSBAV) of the oil and gas field; and
   based on the HSBAV and the SRST, generating a hybrid seismic geological depth grid (HSGD) of the oil and gas field by multiplying the HSBAV grid by the SRST grid.

2. The method of claim 1, wherein the SRST is measured from a seismic reference datum (SRD).

3. The method of claim 1, wherein based on (i) a depth grid of the geological reference surface (GRSD) generated using HA/HZ data, and (ii) a time grid of the seismic reference surface (SRST), generating borehole average velocity data (BAV) comprises:
   subtracting a seismic reference datum from the GRSD to convert the GRSD from True Vertical Depth SubSea Suggest (TVDSS) to True Vertical Depth Seismic Reference Datum (TVDSRD).

4. The method of claim 1, further comprising:
   adding a seismic reference datum to the HSGD to convert the HSGD from True Vertical Depth Seismic Reference Datum (TVDSRD) to True Vertical Depth SubSea Suggest (TVDSS).

5. The method of claim 1, wherein the SRSAV is generated by taking a ratio of a depth grid of the seismic reference surface (SRSD) to the SRST.

6. The method of claim 1, wherein the GRSD is generated using two-dimensional (2D) conformal modelling.

7. The method of claim 1, further comprising using the HSGD to grid a subsurface of the oil and gas field.

8. A device comprising:
   one or more processors; and
   a non-transitory computer-readable storage medium coupled to the one or more processors and storing programming instructions for execution by the one or more processors, the programming instructions instructing the one or more processors to perform operations comprising:
   clipping an average velocity grid of a seismic reference surface (SRSAV), in an oil and gas field, to remove average velocity data of a region containing high-angle, horizontal (HA/HZ) boreholes, wherein the seismic reference surface approximates a geological reference surface;
   based on (i) a depth grid of the geological reference surface (GRSD) generated using HA/HZ borehole data, and (ii) a time grid of the seismic reference surface (SRST), generating borehole average velocity grid (BAV) along the HA/HZ boreholes;
   gridding the BAV with the clipped SRSAV to generate a hybrid seismic borehole average velocity grid (HSBAV) of the oil and gas field; and
   based on the HSBAV and the SRST, generating a hybrid seismic geological depth grid (HSGD) of the oil and gas field by multiplying the HSBAV grid by the SRST grid.

9. The device of claim 8, wherein the SRST is measured from a seismic reference datum (SRD).

10. The device of claim 8, wherein based on (i) a depth grid of the geological reference surface (GRSD) generated using HA/HZ data, and (ii) a time grid of the seismic reference surface (SRST), generating borehole average velocity data (BAV) comprises:
- subtracting a seismic reference datum from the GRSD to convert the GRSD from True Vertical Depth SubSea Suggest (TVDSS) to True Vertical Depth Seismic Reference Datum (TVDSRD).

11. The device of claim 8, wherein the operations further comprise:
- adding a seismic reference datum to the HSGD to convert the HSGD from True Vertical Depth Seismic Reference Datum (TVDSRD) to True Vertical Depth SubSea Suggest (TVDSS).

12. The device of claim 8, wherein the SRSAV is generated by taking a ratio of a depth grid of the seismic reference surface (SRSD) to the SRST.

13. The device of claim 8, wherein the GRSD is generated using two-dimensional (2D) conformal modelling.

14. The device of claim 8, wherein the operations further comprise using the HSGD to grid a subsurface of the oil and gas field.

15. A non-transitory computer-readable medium storing instructions executable by a computer system to perform operations comprising:
- clipping an average velocity grid of a seismic reference surface (SRSAV), in an oil and gas field, to remove average velocity data of a region containing high-angle, horizontal (HA/HZ) boreholes, wherein the seismic reference surface approximates a geological reference surface;
- based on (i) a depth grid of the geological reference surface (GRSD) generated using HA/HZ borehole data, and (ii) a time grid of the seismic reference surface (SRST), generating borehole average velocity grid (BAV) along the HA/HZ boreholes;
- gridding the BAV with the clipped SRSAV to generate a hybrid seismic borehole average velocity grid (HSBAV) of the oil and gas field; and
- based on the HSBAV and the SRST, generating a hybrid seismic geological depth grid (HSGD) of the oil and gas field by multiplying the HSBAV grid by the SRST grid.

16. The non-transitory computer-readable medium of claim 15, wherein the SRST is measured from a seismic reference datum (SRD).

17. The non-transitory computer-readable medium of claim 15, wherein based on (i) a depth grid of the geological reference surface (GRSD) generated using HA/HZ data, and (ii) a time grid of the seismic reference surface (SRST), generating borehole average velocity data (BAV) comprises:
- subtracting a seismic reference datum from the GRSD to convert the GRSD from True Vertical Depth SubSea Suggest (TVDSS) to True Vertical Depth Seismic Reference Datum (TVDSRD).

18. The non-transitory computer-readable medium of claim 15, the operations further comprising:
- adding a seismic reference datum to the HSGD to convert the HSGD from True Vertical Depth Seismic Reference Datum (TVDSRD) to True Vertical Depth SubSea Suggest (TVDSS).

19. The non-transitory computer-readable medium of claim 15, wherein the SRSAV is generated by taking a ratio of a depth grid of the seismic reference surface (SRSD) to the SRST.

20. The non-transitory computer-readable medium of claim 15, wherein the GRSD is generated using two-dimensional (2D) conformal modelling.

* * * * *